United States Patent
Borchert et al.

(10) Patent No.: US 7,824,488 B2
(45) Date of Patent: Nov. 2, 2010

(54) PIGMENT COMPOSITION BASED ON C.I. PIGMENT YELLOW 191

(75) Inventors: Till Borchert, Darmstadt (DE); Martin Ulrich Schmidt, Frankfurt am Main (DE); Arpad Acs, Haeundae-Gu (DE); Ruediger Jung, Kelkheim (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/526,997

(22) PCT Filed: Feb. 12, 2008

(86) PCT No.: PCT/EP2008/001037

§ 371 (c)(1),
(2), (4) Date: Aug. 13, 2009

(87) PCT Pub. No.: WO2008/101612

PCT Pub. Date: Aug. 28, 2008

(65) Prior Publication Data

US 2010/0099039 A1   Apr. 22, 2010

(30) Foreign Application Priority Data

Feb. 20, 2007   (DE) .................. 10 2007 008 218

(51) Int. Cl.
C09B 63/00 (2006.01)
C09B 67/22 (2006.01)
C09B 29/50 (2006.01)
C08K 5/23 (2006.01)

(52) U.S. Cl. .......... 106/494; 106/31.78; 106/31.79; 106/496; 106/498; 430/7; 430/108.23; 524/106; 534/781

(58) Field of Classification Search .............. 106/31.78, 106/31.79, 494, 496, 498; 430/7, 108.23; 524/106; 534/781

See application file for complete search history.

(56) References Cited

U.S. PATENT DOCUMENTS

| 4,980,458 | A | * | 12/1990 | Hari et al. ................ 534/575 |
| 5,047,517 | A | * | 9/1991 | Deucker ................... 534/784 |
| 5,669,967 | A | * | 9/1997 | Hays ........................ 106/496 |
| 5,746,821 | A | * | 5/1998 | Hays ........................ 106/496 |
| 6,235,100 | B1 | * | 5/2001 | Hays ....................... 106/31.78 |
| 6,294,012 | B1 | * | 9/2001 | Bindra ...................... 106/496 |
| 6,469,147 | B2 | | 10/2002 | Nickel et al. |
| 6,504,045 | B2 | | 1/2003 | Jung et al. |
| 6,548,647 | B2 | * | 4/2003 | Dietz et al. ................ 534/582 |
| 6,602,342 | B2 | * | 8/2003 | Schmidt et al. ............ 106/498 |
| 6,913,640 | B2 | * | 7/2005 | Bugnon et al. ............ 106/402 |
| 7,118,623 | B2 | | 10/2006 | Bach et al. |
| 7,135,266 | B2 | | 11/2006 | Baur et al. |
| 7,297,200 | B2 | | 11/2007 | Wuzik et al. |
| 7,311,769 | B2 | | 12/2007 | Weber et al. |
| 7,377,974 | B2 | | 5/2008 | Grimm et al. |
| 7,419,541 | B2 | | 9/2008 | Grimm et al. |
| 7,709,614 | B2 | | 5/2010 | Schmidt et al. |
| 2001/0029294 | A1 | | 10/2001 | Nickel et al. |
| 2003/0083410 | A1 | | 5/2003 | Baur et al. |
| 2006/0228640 | A1 | | 10/2006 | Baur et al. |

FOREIGN PATENT DOCUMENTS

| CZ | 280395 B6 * | 1/1996 |
| DE | 2616981 | 10/1977 |
| EP | 0263074 | 4/1988 |
| EP | 0361431 | 4/1990 |
| EP | 1257602 | 11/2002 |
| EP | 1528084 A1 * | 5/2005 |
| WO | WO 00/78872 | 12/2000 |

OTHER PUBLICATIONS

Co-pending U.S. Appl. No. 12/671,044 by ACS et al., filed Jan. 28, 2010.
PCT International Search report and Preliminary Report on Patentability for PCT/EP2008/001037, mailed May 28, 2008.
English Translation of PCT International Preliminary report on Patentability for PCT/EP2008/001037, mailed Sep. 17, 2009.
English abstract for DE 2616981, Oct. 27, 1977.

* cited by examiner

Primary Examiner—Anthony J Green
(74) Attorney, Agent, or Firm—Anthony A. Bisulca

(57) ABSTRACT

The invention relates to a pigment composition based on P.Y. 191 of the formula (1) containing 0.05 to 30 mol %, based on the sum of P.Y. 191 and a further yellow colorant, of at least one further yellow colorant of the formula (2) and/or of C.I. Pigment Yellow 100 in which R1, R2, R3 and R4 are each independently hydrogen, halogen, —$CH_3$, —$NO_2$, or NH—R6 where R6 is $C_1$-$C_4$-alkyl; R5 is methyl or carboxyl, and where the compound of the formula (2) is not C.I. Pigment Yellow 191.

12 Claims, No Drawings

PIGMENT COMPOSITION BASED ON C.I. PIGMENT YELLOW 191

The present invention describes a pigment composition based on C.I. Pigment Yellow 191 (hereinafter called P.Y. 191) with other colorants as a doping component, and also its production and use.

P.Y. 191 refers to the compound of formula (1), which is formed from a coupling of diazotized 2-amino-4-chloro-5-methylbenzenesulfonic acid with 1-(3'-sulfophenyl)-3-methyl-5-pyrazolone and subsequent reaction of the resulting disulfo acid with a calcium salt. P.Y. 191 is described in EP-B1-0 361 431.

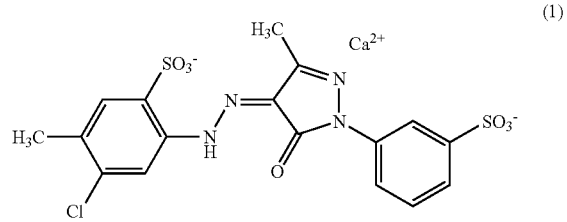

(1)

In the solid state, compound (1) can also exist in some other tautomeric and/or cis-trans isomeric form. P.Y. 191 is predominantly used for coloration of plastics. The pigment has a multiplicity of favorable properties for this purpose, examples being high lightfastness and high heat resistance. However, color strength is distinctly inferior compared with other pigments such as P.Y. 180 for example.

CZ-B6-280 395 describes a mixed diazotization which leads to pigment compositions comprising the chromophores of P.Y. 191 and P.Y. 183, but with mixed calcium/fatty ammonium cations.

It is an object of the present invention to increase the color strength of C.I. Pigment Yellow 191 and to improve its transparency.

We have found that, surprisingly, certain yellow pyrazolone pigments added in a suitable manner as a doping component to P.Y. 191 are capable of increasing the color strength compared with pure P.Y. 191 and of increasing transparency.

The present invention provides pigment compositions based on P.Y. 191 of formula (1)

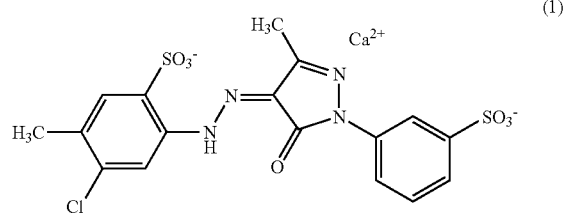

(1)

comprising 0.05 to 30 mol %, preferably 0.1 to 15 mol %, more preferably 0.5 to 10 mol % and particularly preferably 1 to 5 mol %, based on the sum total of P.Y. 191 and the further yellow colorant, of at least one further yellow colorant of formula (2) and/or of C.I. Pigment Yellow 100,

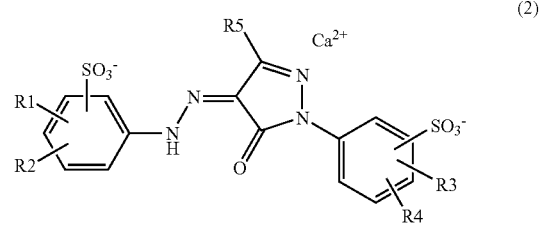

(2)

where R1, R2, R3 and R4 are each independently hydrogen, halogen, —CH$_3$, —NO$_2$ or NH—R6 where R6 is C$_1$-C$_4$-alkyl;

R5 is methyl or carboxyl, and the compound of formula (2) is not C.I. Pigment Yellow 191.

Halogen may be fluorine, chlorine, bromine or iodine, preferably chlorine.

Preferred compounds of formula (2) are those where R1=R2=Cl, R3=R4=H or Cl and R5=CH$_3$.

P.Y. 183 is very particularly preferred.

The compounds of formula (1) and (2) can also be present in some other tautomeric and/or cis-trans isomeric form and, if appropriate, additionally contain sodium or chlorine ions and also water.

The pigment compositions of the present invention are sparingly soluble and notable for high color strengths, good fastnesses and yellow colorations of high transparency.

The invention provides in particular a pigment composition as defined above and obtained by at least one of the following production steps for P.Y. 191 and the further yellow colorant being carried out conjointly: (a) azo coupling; (b) laking.

The invention also provides a process for producing the pigment composition of the present invention by diazotization, azo coupling, laking and optionally finishing, characterized in that at least one of the following production steps for P.Y. 191 and the further yellow colorant is carried out conjointly: (a) azo coupling; (b) laking.

For example, two different amines of formula (4) can be separately diazotized and then conjointly coupled onto 1-(3'-sulfophenyl)-3-methyl-5-pyrazolone.

In suitable cases, pigment compositions of the present invention are also obtainable by 2-amino-4-chloro-5-methylbenzenesulfonic acid being diazotized and coupled onto a mixture of 1-(3'-sulfophenyl)-3-methyl-5-pyrazolone and a different compound of general formula (5). Alternatively, coupling can also be carried out in succession.

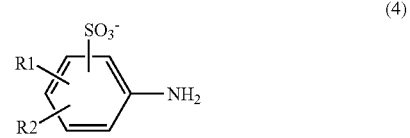

(4)

-continued

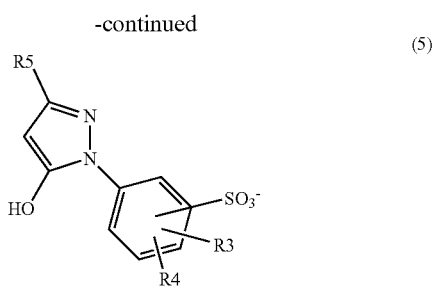

(5)

R1, R2, R3, R4 and R5 each have the aforementioned meanings.

The diazotization reaction is suitably carried out with alkali metal nitrites or the alkyl nitrites of short-chain alkanes, together with strong mineral acids. Sodium nitrite and hydrochloric acid are particularly suitable. The reaction can be carried out in a temperature range from −5° C. to +35° C., preferably between 0° C. and 10° C.

Coupling is possible by following a direct or indirect method, but preferably directly, i.e., the diazonium salt being added to the initially charged coupling component. The coupling reaction can be carried out in a temperature range between −5° C. and 80° C., preferably between 10° C. and 50° C., and at a pH between pH 3 and 14, preferably between pH 5 and 8. The azo coupling reaction preferably takes place in aqueous solution or suspension, but it is also possible to use organic solvents, if appropriate mixed with water. In general, the coupling component is used in a slight excess based on the diazonium compound, and preferably 1 equivalent of diazo component is reacted with 1.001 to 1.10 equivalents of coupling component.

The unlaked coupling suspension is subsequently laked with a calcium salt, preferably calcium chloride.

After laking, the pigment composition of the present invention can be subjected to a heat treatment in an aqueous, aqueous-organic or organic medium at temperatures between 60° C. and 98° C., preferably between 60° C. and 85° C., if appropriate under superatmospheric pressure, for 0.1 to 4 hours.

The pigment suspension obtained can subsequently be filtered in a conventional manner and the press cake be washed salt-free with water, dried and ground. It can be advantageous to first subject the as-synthesized pigment composition to a customary mechanical fine division, for example a grinding operation. Fine division can be effected by wet or dry grinding or kneading. Grinding or kneading may be followed by the above-described thermal treatment with a solvent, with water or a solvent-water mixture to convert the pigment into a useful form.

In an alternative embodiment, the pigment compositions of the present invention are obtainable by preparing P.Y. 191 in the presence of the final doping component. The doping component may in this case be added before coupling or laking.

It is possible for customary pigment dispersants, anionic or nonionic surfactants, defoamers, extenders or other customary admixtures to be added at any point of the process, provided they do not compromise the advantages of the present invention. Mixtures of these addition materials can also be used. The addition materials can be added all at once or in two or more portions. The addition materials can be added at any point of the synthesis or the various aftertreatments or after the aftertreatments. The most suitable time first has to be determined in range-finding experiments.

It is also possible for one or more of the recited operations for producing the pigment compositions of the present invention to be carried out in a microreactor as described in EP-A-1 257 602 for example. In this case, the heat treatment can also be distinctly shorter than one hour, for example in the range from 0.01 to 600 seconds.

The pigment compositions of the present invention are useful for pigmentation and coloration of natural and synthetic materials of any kind, particularly of paints, coating systems, such as wallpaper colors, printing inks, emulsion and varnish colors, in particular for metallic varnishes, which are water- and/or solvent-containing.

The pigment compositions of the present invention are further useful for coloration of macromolecular materials of any kind, for example natural and synthetic fiber materials, preferably cellulose fibers, but also for paper pulp dyeing and also laminate coloration. Further applications are the manufacture of printing inks, for example textile print pastes, flexographic print inks, decorative printing inks or gravure printing inks, wallpaper colors, water-thinnable varnishes, wood preservation systems, viscose dope dyeings, varnishes, sausage casings, seed, fertilizers, glass, in particular glass bottles, and also for mass coloration of roof shingles, as colorants in electrophotographic toners and developers, for coloration of renders, concrete, woodstains, colored pencil leads, felt tip pens, waxes, paraffins, graphics inks, ballpoint pen pastes, crayons, washing and cleaning compositions, shoe care agents, latex products, abrasives and also for coloration of plastics and high molecular weight materials of any kind.

High molecular weight organic materials include for example cellulose ethers and esters, such as ethylcellulose, nitrocellulose, cellulose acetate or cellulose butyrate, natural resins or synthetic resins, such as addition polymerization resins or condensation resins, for example aminoplasts, in particular urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, latices, silicone, silicone resins, individually or mixed.

The pigment compositions of the present invention are further useful in the manufacture of liquid printing inks for use in all conventional inkjet printers, in particular for those which are based on the bubble jet or piezo process, for example on an aqueous or nonaqueous basis ("solvent based"), microemulsion inks, UV-curable inks and also in such inks which work according to the hot melt process. These liquid printing inks can be used for printing paper and also natural or synthetic fiber materials, films, foils and plastics. In addition, the pigment compositions of the present invention can be used for printing a wide variety of species of coated or uncoated substrate materials, for example for printing paperboard, cardboard, wood and woodbase materials, metallic materials, semiconductor materials, ceramic materials, glasses, glass and ceramic fibers, inorganic materials of construction, concrete, leather, comestibles, cosmetics, skin and hair. The substrate material can be two-dimensionally planar or have a spatial extent, i.e., be three-dimensionally configured, and printed or coated not only completely but also only partially.

The pigment compositions of the present invention are further useful as colorants for powders and powder coatings, in particular for triboelectrically or electrokinetically sprayable powder coatings used for surface coating of articles composed for example of metal, wood, plastic, glass, ceramic, concrete, textile material, paper or rubber.

The pigment compositions of the present invention are also useful as colorants for color filters for flat panel displays, not only for additive but also for subtractive color generation, also for photoresists, and also as colorants for "electronic inks" ("e-inks") or "electronic paper" ("e-paper").

In the examples which follow, percentages and parts are by weight.

Comparative example (as per CZ 280395 B6):

To 700 ml of water are added 18 g of calcium hydroxide, 1 g of activated carbon, 17.7 g (0.08 mol) of 2-amino-4-chloro-5-methylbenzenesulfonic acid and 4.8 g (0.02 mol) of 2-amino-4,5-dichlorobenzenesulfonic acid, and the mixture is heated to 60° C. and stirred until everything has dissolved. Then, 13.3 ml of 40% sodium nitrite solution are added. The solution is filtered. At 0 to 10° C. 25 ml of hydrochloric acid (31%) are added a little at a time.

To 700 ml of water are added 14.5 g of calcium carbonate, 1 g of activated carbon and 28 g (0.11 mol) of 1-(3'-sulfophenyl)-3-methylpyrazol-5-one, and the mixture is set to 30° C. and stirred until everything has dissolved. The solution is filtered and the filtrate is cooled down to 10 to 15° C. At 15° C. the previously prepared diazonium salt solution is added a little at a time.

After coupling, the pigment suspension formed is admixed with 0.8 g of a solution of octadecylamine in dilute acetic acid. The reaction mixture is subsequently stirred for 2 to 3 h at 90 to 95° C. and filtered, and the filter residue is washed. The press cake is dried at 120° C. to obtain 53 g of yellow pigment powder.

SYNTHESIS EXAMPLE 1

22.1 g (0.1 mol) of 2-amino-4-chloro-5-methylbenzene-1-sulfonic acid are introduced into 200 ml of water and dissolved with 9.1 ml of aqueous sodium hydroxide solution (33%) by heating, clarified and admixed with 25.0 ml of hydrochloric acid (31%). The suspension obtained is cooled at 15° C. and diazotized by addition of 13.3 ml of 40% sodium nitrite solution.

To 400 ml of water and 11.1 ml of aqueous sodium hydroxide solution (33%) are added 24.6 g (0.0975 mol) of 1-(3'-sulfophenyl)-3-methyl-5-pyrazolone and 0.7 g (0.0025 mol) of 1-(4'-sulfophenyl)-5-pyrazolone-3-carboxylic acid, and the mixture is dissolved.

The suspension of the diazonium salt is gradually added to the hot solution of the coupling component at 60° C. while maintaining the pH in the range from 6.0 to 6.5 by addition of aqueous sodium hydroxide solution. After coupling has ended, the yellow suspension is heated to 80° C. Subsequently, 33.7 g of calcium chloride are added. The pigment suspension is subsequently stirred for 2 hours at 80° C. and filtered, and the filter residue is washed and dried at 120° C. to obtain 48 g of yellow pigment powder.

SYNTHESIS EXAMPLE 2

Synthesis example 1 is repeated with 22.8 g (0.09 mol) of 1-(3'-sulfophenyl)-3-methyl-5-pyrazolone and 2.8 g (0.01 mol) of 1-(4'-sulfophenyl)-5-pyrazolone-3-carboxylic acid in the initial charge and with 35.0 g of calcium chloride being used for laking. 44 g of yellow pigment powder are obtained.

SYNTHESIS EXAMPLE 3

Synthesis example 1 is repeated with 19.0 g (0.075 mol) of 1-(3'-sulfophenyl)-3-methyl-5-pyrazolone and 7.1 g (0.025 mol) of 1-(4'-sulfophenyl)-5-pyrazolone-3-carboxylic acid in the initial charge and with 37.5 g of calcium chloride being used for laking. 39 g of yellow pigment powder are obtained.

SYNTHESIS EXAMPLE 4

22.1 g (0.1 mol) of 2-amino-4-chloro-5-methylbenzene-1-sulfonic acid are introduced into 200 ml of water and dissolved with 9.1 ml of aqueous sodium hydroxide solution (33%) by heating, clarified and admixed with 25.0 ml of hydrochloric acid (31%). The suspension obtained is cooled at 15° C. and diazotized by addition of 13.3 ml of 40% sodium nitrite solution.

To 400 ml of water and 11.1 ml of aqueous sodium hydroxide solution (33%) are added 24.8 g (0.0975 mol) of 1-(3'-sulfophenyl)-3-methyl-5-pyrazolone and 0.6 g (0.0025 mol) of 1-(4'-sulfophenyl)-3-methyl-5-pyrazolone, and the mixture is dissolved.

The suspension of the diazonium salt is gradually added to the hot solution of the coupling component at 60° C. while maintaining the pH in the range from 6.0 to 6.5 by addition of aqueous sodium hydroxide solution. After coupling has ended, the yellow suspension is heated to 80° C. Subsequently, 33.7 g of calcium chloride are added. The pigment suspension is subsequently stirred for 2 hours at 80° C. and filtered, and the filter residue is washed and dried at 120° C. to obtain 53 g of yellow pigment powder.

SYNTHESIS EXAMPLE 5

21.6 g (0.0975 mol) of 2-amino-4-chloro-5-methylbenzene-1-sulfonic acid are introduced into 200 ml of water and dissolved with 9.1 ml of aqueous sodium hydroxide solution (33%) by heating, clarified and admixed with 25.0 ml of hydrochloric acid (31%). The suspension obtained is cooled at 15° C. and diazotized by addition of 13.3 ml of 40% sodium nitrite solution.

To 400 ml of water and 11.1 ml of aqueous sodium hydroxide solution (33%) are added 24.8 g (0.0975 mol) of 1-(3'-sulfophenyl)-3-methyl-5-pyrazolone, and the mixture is dissolved.

The suspension of the diazonium salt is gradually added to the hot solution of the coupling component at 60° C. while maintaining the pH in the range from 6.0 to 6.5 by addition of aqueous sodium hydroxide solution. After coupling has ended, 1.2 g (0.0025 mol) of 5-chloro-2-[5-hydroxy-3-methyl-1-(3-sulfophenyl)-1H-pyrazol-4-ylazo]-4-methylbenzene-1-sulfonic acid are added and the yellow suspension is heated to 80° C. Subsequently, 40 g of calcium chloride are added. The pigment suspension is subsequently stirred for 2 hours at 80° C. and filtered, and the filter residue is washed and dried at 120° C. to obtain 55 g of yellow pigment powder.

SYNTHESIS EXAMPLE 6

Synthesis example 5 is repeated with 19.9 g (0.09 mol) of 2-amino-4-chloro-5-methylbenzene-1-sulfonic acid being diazotized and coupled onto 22.9 g (0.09 mol) of 1-(3'-sulfophenyl)-3-methyl-5-pyrazolone. The coupling suspension is admixed with 4.8 g (0.01 mol) of 5-chloro-2-[5-hydroxy-3-methyl-1-(3-sulfophenyl)-1H-pyrazol-4-ylazo]-4-methylbenzene-1-sulfonic acid and laked with 45 g of calcium chloride. 53 g of yellow pigment powder are obtained.

SYNTHESIS EXAMPLE 7

Synthesis example 5 is repeated with 16.6 g (0.075 mol) of 2-amino-4-chloro-5-methylbenzene-1-sulfonic acid being diazotized and coupled onto 19.1 g (0.075 mol) of 1-(3'-sulfophenyl)-3-methyl-5-pyrazolone. The coupling suspension is admixed with 12.1 g (0.025 mol) of 5-chloro-2-[5-hydroxy-3-methyl-1-(3-sulfophenyl)-1H-pyrazol-4-ylazo]-4-methylbenzene-1-sulfonic acid (100%) and laked with 50 g of calcium chloride (77%). 53 g of yellow pigment powder are obtained.

SYNTHESIS EXAMPLE 8

22.1 g (0.1 mol) of 2-amino-4-chloro-5-methylbenzene-1-sulfonic acid are introduced into 200 ml of water and dissolved with 9.1 ml of aqueous sodium hydroxide solution (33%) by heating, clarified and admixed with 25.0 ml of hydrochloric acid (31%). The suspension obtained is cooled at 15° C. and diazotized by addition of 13.3 ml of 40% sodium nitrite solution.

To 400 ml of water and 11.1 ml of aqueous sodium hydroxide solution (33%) are added 25.4 g (0.1 mol) of 1-(3'-sulfophenyl)-3-methyl-5-pyrazolone, and the mixture is dissolved.

The suspension of the diazonium salt is gradually added to the hot solution of the coupling component at 60° C. while maintaining the pH in the range from 6.0 to 6.5 by addition of aqueous sodium hydroxide solution. After coupling has ended, 1.4 g (0.0025 mol) of 4,5-dichloro-2-[5-hydroxy-3-methyl-1-(3-sulfophenyl)-1H-pyrazol-4-ylazo]benzenesulfonic acid, calcium salt are added and the yellow suspension is heated to 80° C. Subsequently, 33.3 g of calcium chloride are added. The pigment suspension is subsequently stirred for 2 hours at 80° C. and filtered, and the filter residue is washed and dried at 120° C. to obtain 55 g of yellow pigment powder.

SYNTHESIS EXAMPLE 9

Synthesis example 8 is repeated with the coupling suspension being admixed with 6.0 g (0.011 mol) of 4,5-dichloro-2-[5-hydroxy-3-methyl-1-(3-sulfophenyl)-1H-pyrazol-4-ylazo]benzenesulfonic acid, calcium salt. 60 g of yellow pigment powder are obtained.

SYNTHESIS EXAMPLE 10

Synthesis example 8 is repeated with the coupling suspension being admixed with 12.7 g (0.023 mol) of 4,5-dichloro-2-[5-hydroxy-3-methyl-1-(3-sulfophenyl)-1H-pyrazol-4-ylazo]benzenesulfonic acid, calcium salt. 67 g of yellow pigment powder are obtained.

SYNTHESIS EXAMPLE 11

21.6 g (0.0975 mol) of 2-amino-4-chloro-5-methylbenzene-1-sulfonic acid are introduced into 200 ml of water and dissolved with 9.1 ml of aqueous sodium hydroxide solution (33%) by heating, clarified and admixed with 25.0 ml of hydrochloric acid (31%). The suspension obtained is cooled at 15° C. and diazotized by addition of 13.3 ml of 40% sodium nitrite solution.

To 400 ml of water and 11.1 ml of aqueous sodium hydroxide solution (33%) are added 24.8 g (0.0975 mol) of 1-(3'-sulfophenyl)-3-methyl-5-pyrazolone, and the mixture is dissolved.

The suspension of the diazonium salt is gradually added to the hot solution of the coupling component at 60° C. while maintaining the pH in the range from 6.0 to 6.5 by addition of aqueous sodium hydroxide solution. After coupling has ended, 1.4 g (0.0025 mol) of 4,5-dichloro-2-[5-hydroxy-3-carboxyl-1-(4-sulfophenyl)-1H-pyrazol-4-ylazo]benzene-1-sulfonic acid are added, and the yellow suspension is heated to 80° C. Subsequently, 40 g of calcium chloride are added. The pigment suspension is subsequently stirred for 2 hours at 80° C. and filtered, and the filter residue is washed and dried at 120° C. to obtain 54 g of yellow pigment powder.

SYNTHESIS EXAMPLE 12

Synthesis example 11 is repeated with 19.9 g (0.09 mol) of 2-amino-4-chloro-5-methylbenzene-1-sulfonic acid being diazotized and coupled onto 22.9 g (0.09 mol) of 1-(3'-sulfophenyl)-3-methyl-5-pyrazolone. The coupling suspension is admixed with 5.4 g (0.01 mol) of 4,5-dichloro-2-[5-hydroxy-3-carboxyl-1-(4-sulfophenyl)-1H-pyrazol-4-ylazo]benzene-1-sulfonic acid and laked with 45 g of calcium chloride. 49 g of yellow pigment powder are obtained.

SYNTHESIS EXAMPLE 13

Synthesis example 11 is repeated with 16.6 g (0.075 mol) of 2-amino-4-chloro-5-methylbenzene-1-sulfonic acid being diazotized and coupled onto 19.1 g (0.075 mol) of 1-(3'-sulfophenyl)-3-methyl-5-pyrazolone. The coupling suspension is admixed with 13.5 g (0.025 mol) of 4,5-dichloro-2-[5-hydroxy-3-carboxyl-1-(4-sulfophenyl)-1H-pyrazol-4-ylazo]benzene-1-sulfonic acid and laked with 50 g of calcium chloride. 41 g of yellow pigment powder are obtained.

SYNTHESIS EXAMPLE 14

22.1 g (0.1 mol) of 2-amino-4-chloro-5-methylbenzene-1-sulfonic acid are introduced into 200 ml of water and dissolved with 9.1 ml of aqueous sodium hydroxide solution (33%) by heating, clarified and admixed with 25.0 ml of hydrochloric acid (31%). The suspension obtained is cooled at 15° C. and diazotized by addition of 13.3 ml of 40% sodium nitrite solution.

To 400 ml of water and 11.1 ml of aqueous sodium hydroxide solution (33%) are added 25.4 g (0.1 mol) of 1-(3'-sulfophenyl)-3-methyl-5-pyrazolone, and the mixture is dissolved.

The suspension of the diazonium salt is gradually added to the hot solution of the coupling component at 60° C. while maintaining the pH in the range from 6.0 to 6.5 by addition of aqueous sodium hydroxide solution. After coupling has ended, 1.4 g (0.0026 mol) of C.I. Acid Yellow 23 are added and the yellow suspension is heated to 80° C. Subsequently, 40 g of calcium chloride are added. The pigment suspension is subsequently stirred for 2 hours at 80° C. and filtered, and the filter residue is washed and dried at 120° C. to obtain 53 g of yellow pigment powder.

SYNTHESIS EXAMPLE 15

Synthesis example 14 is repeated with the coupling suspension being admixed with 6.0 g (0.011 mol) of C.I. Acid Yellow 23 and laked with 45 g of calcium chloride. 51 g of yellow pigment powder are obtained.

SYNTHESIS EXAMPLE 16

Synthesis example 14 is repeated with the coupling suspension being admixed with 18.0 g (0.033 mol) of C.I. Acid Yellow 23 and laked with 50 g of calcium chloride. 48 g of yellow pigment powder are obtained.

USE EXAMPLE 1

682 parts of an unplasticized PVC (Hostalit® S 4170), 308 parts of diisodecyl phthalate and 10 parts of dibutyltin thioglycolate are weighed out and mixed in a mixing vessel. The base mixture prepared is in each case admixed with 1 part of pigment composition from synthesis examples 1 to 16. This is followed by mixing in the mixer for 10 minutes, and the mixture is subsequently put on a roll stand and processed at about 130° C. for 8 min to obtain a transparently colored unplasticized PVC mat.

USE EXAMPLE 2

682 parts of an unplasticized PVC (Hostalit® S 4170), 308 parts of diisodecyl phthalate, 10 parts of dibutyltin thioglycolate and 10 parts of titanium dioxide pigment (PV-Echtweiβ R 01) are weighed out and mixed in a mixing vessel. The base mixture prepared is in each case admixed with 1 part of pigment composition from synthesis examples 1 to 16. This is followed by mixing in the mixer for 10 minutes, and the mixture is subsequently put on a roll stand and processed at about 130° C. for 8 min to obtain an opaquely colored unplasticized PVC mat.

Testing of Coloristic Properties of Colorant Preparations:

To determine the color strength and hue difference dH, a use preparation was prepared of every pigment preparation in accordance with use example 2. The coloristic properties (color strength and hue—dH) were subsequently determined with the aid of a CM-3700d spectrophotometer from Minolta.

Positive dH values indicate a greenish tinge and negative dH values a reddish tinge compared with standard.

To determine transparency, a use preparation was prepared of each pigment preparation in accordance with use example 1. Transparency was subsequently assessed visually.

The standard used for the color strength, the hue difference dH and the transparency was the product as per example 1 of EP-A-0 361 431.

The results obtained are shown in table 1. "tra" denotes more transparent and "de" denotes more hiding than standard. "dC" denotes cleanness of hue (chroma):

TABLE 1

| Example | Color strength [%] | dH | dC | Transparency |
|---|---|---|---|---|
| Comparative example | 94.3 | −2.07 | −0.97 | 5 de |
| Standard Synthesis example | 100% | +/−0 | +/−0 | — |
| 1 | 138.0 | 4.34 | 0.71 | 5 tra |
| 2 | 110.4 | 4.04 | 0.49 | 5 tra |
| 3 | 123.0 | 4.36 | 0.63 | 5 tra |
| 4 | 112.2 | 4.32 | 0.19 | 5 tra |
| 5 | 121.6 | 1.19 | 0.34 | 4 tra |
| 6 | 115.9 | 0.13 | 0.06 | 4 tra |
| 7 | 110.6 | −1.09 | −0.40 | 4 tra |
| 8 | 123.1 | 1.23 | 0.64 | 4 tra |
| 9 | 121.6 | 0.90 | 0.4 | 3 tra |
| 10 | 126.7 | 1.33 | 0.32 | 4 tra |
| 11 | 113.4 | 2.59 | 0.37 | 4 tra |
| 12 | 111.2 | 3.11 | 0.46 | 4 tra |
| 13 | 110.8 | 2.88 | 0.44 | 5 tra |
| 14 | 116.9 | 1.31 | 0.38 | 4 tra |
| 15 | 116.4 | 1.29 | 0.30 | 4 tra |
| 16 | 115.3 | 1.08 | 0.19 | 4 tra |

What is claimed is:

1. A pigment composition based on P.Y. 191 of formula (1)

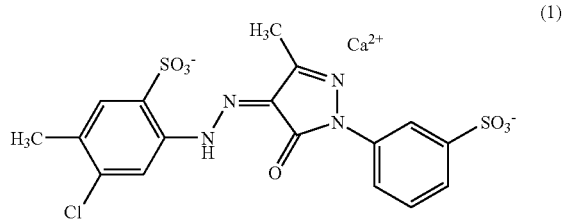

(1)

comprising 0.05 to 5 mol %, based on the sum total of the P.Y. 191 and a further yellow colorant, wherein the further yellow colorant is of formula (2), of C.I. Pigment Yellow 100, or both

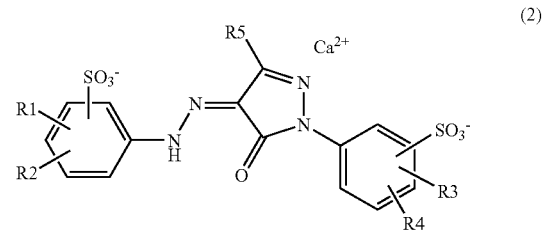

(2)

wherein R1, R2, R3 and R4 are each independently hydrogen, halogen, —CH$_3$, —NO$_2$ or NH—R6, wherein R6 is C$_1$-C$_4$-alkyl;

R5 is methyl or carboxyl, and the compound of formula (2) is not C.I. Pigment Yellow 191.

2. The pigment composition as claimed in claim 1, comprising 0.1 to 5 mol % of the further yellow colorant.

3. The pigment composition as claimed in claim 1, comprising 1 to 5 mol % of the further yellow colorant.

4. The pigment composition as claimed in claim 1, wherein in the compound of formula (2) R1=R2=Cl, R3=R4=H or Cl and R5=CH$_3$.

5. The pigment composition as claimed in claim 1, wherein the compound of formula (2) is C.I. Pigment Yellow 183.

6. The pigment composition as claimed in claim 1, obtained by at least one of the following production steps for P.Y. 191 and the further yellow colorant being carried out conjointly:

(a) azo coupling; (b) laking.

7. A process for producing a pigment composition as claimed in claim 1, comprising the steps of diazotization, azo coupling, laking and optionally finishing, wherein at least one of the following production steps for P.Y. 191 and the further yellow colorant is carried out conjointly: (a) azo coupling; (b) laking.

8. The process as claimed in claim 7, wherein two different amines of formula (4)

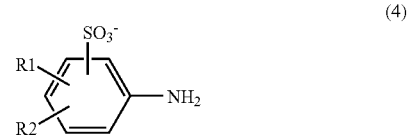

(4)

wherein R1 and R2 are each independently hydrogen, halogen, —CH₃, —NO₂ or
NH—R6 wherein R6 is $C_1$-$C_4$-alkyl,
are separately diazotized and conjointly coupled onto 1-(3'-sulfophenyl)-3-methyl-5-pyrazolone.

9. The process as claimed in claim 7, wherein 2-amino-4-chloro-5-methylbenzenesulfonic acid is diazotized and coupled onto a mixture of 1-(3'-sulfophenyl)-3-methyl-5-pyrazolone and a compound of general formula (5)

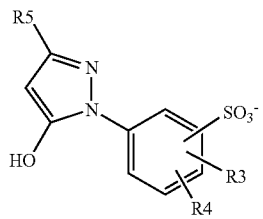

(5)

wherein
R3 and R4 are each independently hydrogen, halogen, —CH₃, —NO₂ or NH—R6 wherein R6 is $C_1$-$C_4$-alkyl; and
R5 is methyl or carboxyl.

10. A natural or synthetic material pigmented by a pigment composition as claimed in claim 1.

11. A composition pigmented by a pigment composition as claimed in claim 1, wherein the composition is in the form of electrophotographic toners, inkjet inks, metallic varnishes and color filters.

12. The natural or synthetic materials as claimed in claim 10, wherein the natural or synthetic material is selected from the group consisting of paints, coating systems, wallpaper colors, printing inks, emulsion and varnish colors which are water- and/or solvent-containing, and plastics.

* * * * *